(12) United States Patent
Chang (10) Patent No.: US 8,824,153 B2
(45) Date of Patent: Sep. 2, 2014

(54) CHIP CARD HOLDER AND ELECTRONIC DEVICE WITH SAME

(75) Inventor: Chia-Hsin Chang, New Taipei (TW)

(73) Assignee: Chi Mei Communication Systems Inc., New Taipei (TW)

( * ) Notice: Subject to any disclaimer, the term of this patent is extended or adjusted under 35 U.S.C. 154(b) by 43 days.

(21) Appl. No.: 13/524,331

(22) Filed: Jun. 15, 2012

(65) Prior Publication Data

US 2013/0235534 A1 Sep. 12, 2013

(30) Foreign Application Priority Data

Mar. 8, 2012 (CN) .......................... 2012 1 0059701

(51) Int. Cl.
*H05K 5/00* (2006.01)
(52) U.S. Cl.
USPC ........... 361/754; 361/737; 361/748; 361/752; 361/769; 361/787
(58) Field of Classification Search
CPC ..... H05K 1/14; H05K 7/1461; H05K 7/1418; H01L 23/5389; H01L 25/0652; G06K 13/0831; G06K 13/085; G06K 7/0039; G06K 13/06; H04B 1/3816; H04Q 1/023; A45C 2011/188; H04M 1/026
USPC ......... 361/737, 748, 752, 754, 759, 769, 787, 361/798, 801, 807, 825, 829
See application file for complete search history.

(56) References Cited

U.S. PATENT DOCUMENTS

| 6,035,216 | A | 3/2000 | Cheng et al. |
| 6,602,096 | B1 | 8/2003 | Kronestedt et al. |
| 7,233,489 | B2 * | 6/2007 | Toyama et al. .......... 361/679.31 |
| 2011/0092087 | A1 | 4/2011 | Jung et al. |
| 2011/0267787 | A1 * | 11/2011 | Duan et al. .................... 361/756 |

* cited by examiner

*Primary Examiner* — Robert J Hoffberg
*Assistant Examiner* — Hung Dang
(74) *Attorney, Agent, or Firm* — Novak Druce Connolly Bove + Quigg LLP (57) ABSTRACT

A chip card holder for holding at least two chip cards is disclosed. The chip card holder includes a base, a drawer slidably attached to the base. The drawer includes at least two receiving spaces, each receiving space for receiving a chip card. The drawer moves relative to the base to make the at least two receiving spaces be exposed out of the base or be received in the base.

10 Claims, 9 Drawing Sheets

CHIP CARD HOLDER AND ELECTRONIC DEVICE WITH SAME

CROSS-REFERENCE TO RELATED APPLICATIONS

This application is related to co-pending U.S. patent applications, entitled "CHIP CARD HOLDER AND ELECTRONIC DEVICE WITH SAME"; and co-pending U.S. patent application (U.S. Ser. No. 13/453,156), entitled "PORTABLE ELECTRONIC DEVICE WITH CHIP CARD HOLDER", all by CHIA-HSIN CHANG. These applications have the same assignee as the present application. The above-identified applications are incorporated herein by reference.

BACKGROUND

1. Technical Field

The present disclosure relates to chip card holders, and particularly to electronic devices with chip card holders and methods for putting chip cards.

2. Description of Related Art

A dual-SIM capable mobile terminal uses one or two SIM cards. A dual-SIM mobile terminal with two SIM cards can switch between SIM cards according to a user selection. A dual-SIM mobile terminal with two SIM cards can also be used with two different phone numbers Typical chip card holders defines two side-by-side receiving spaces for receiving the SIM cards, Side-by-side grooves, however, occupy a large area of the mobile terminal.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card holder and electronic device using the chip card holders. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
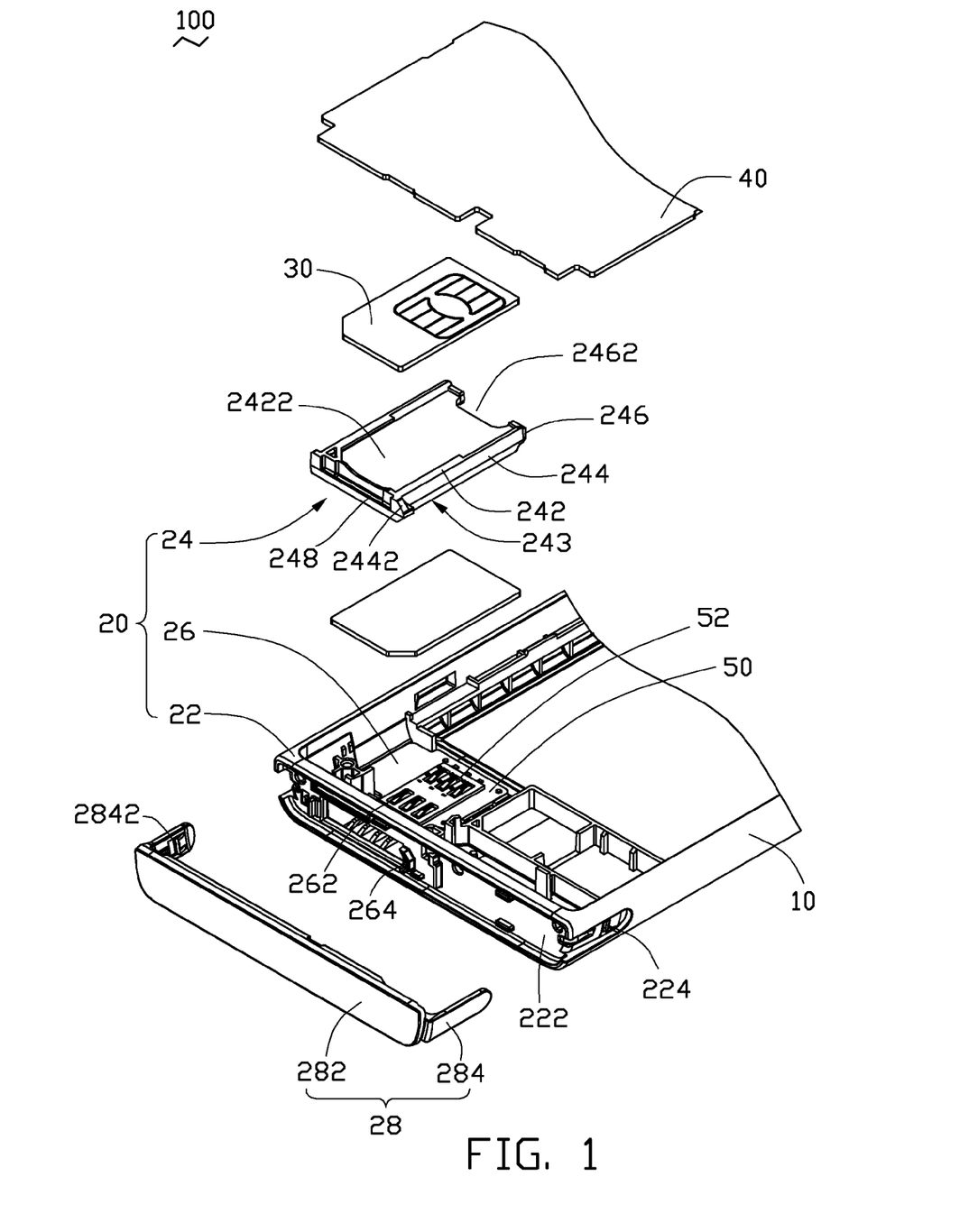
FIG. 1 is an exploded view of a first exemplary embodiment of a chip card holder as used in an electronic device, the portion of the electronic device including a housing, two chip cards and a chip card holder.
Figure 2:
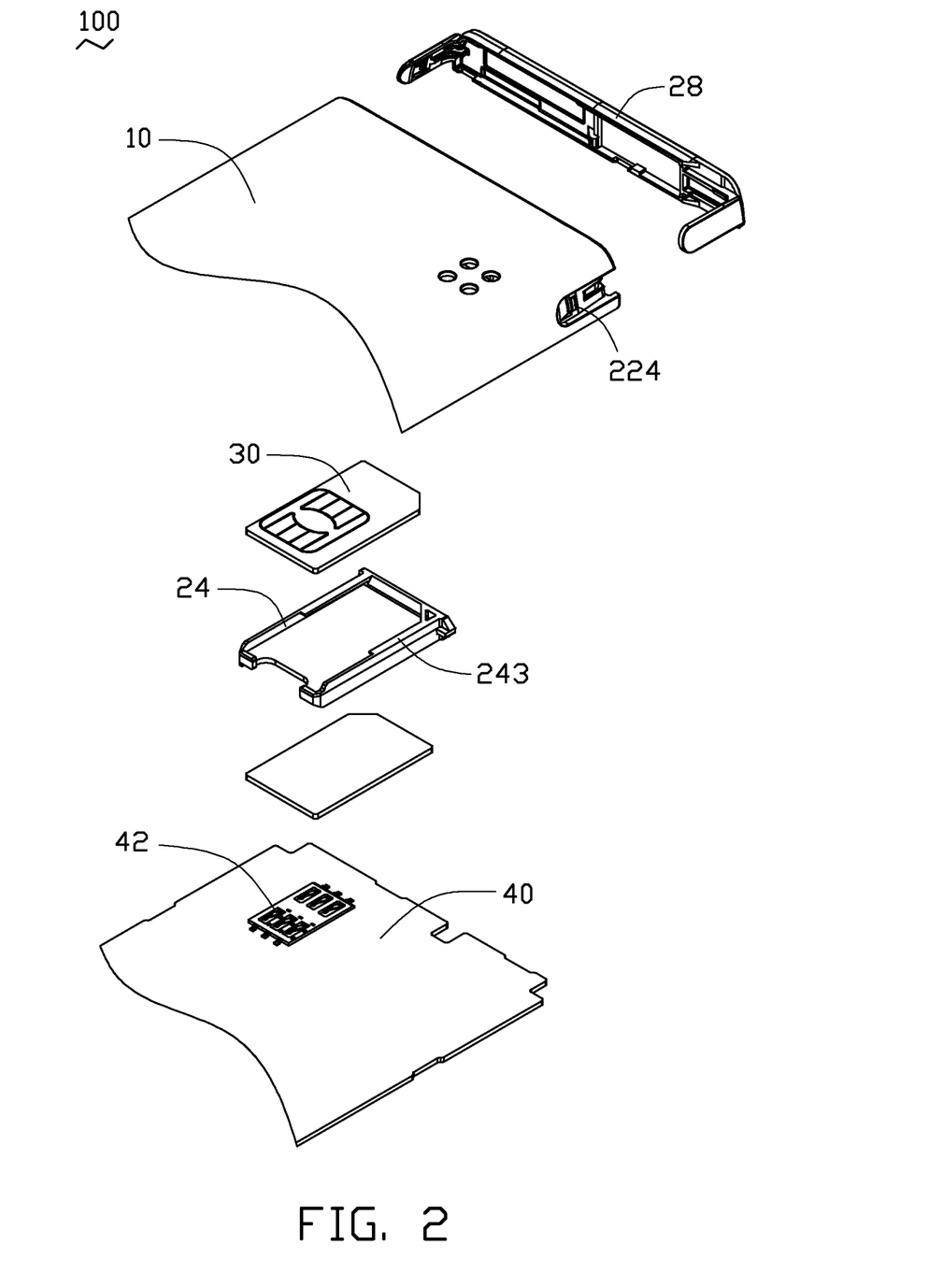
FIG. 2 is similar to FIG. 1, but viewing from anther aspect.
Figure 3:
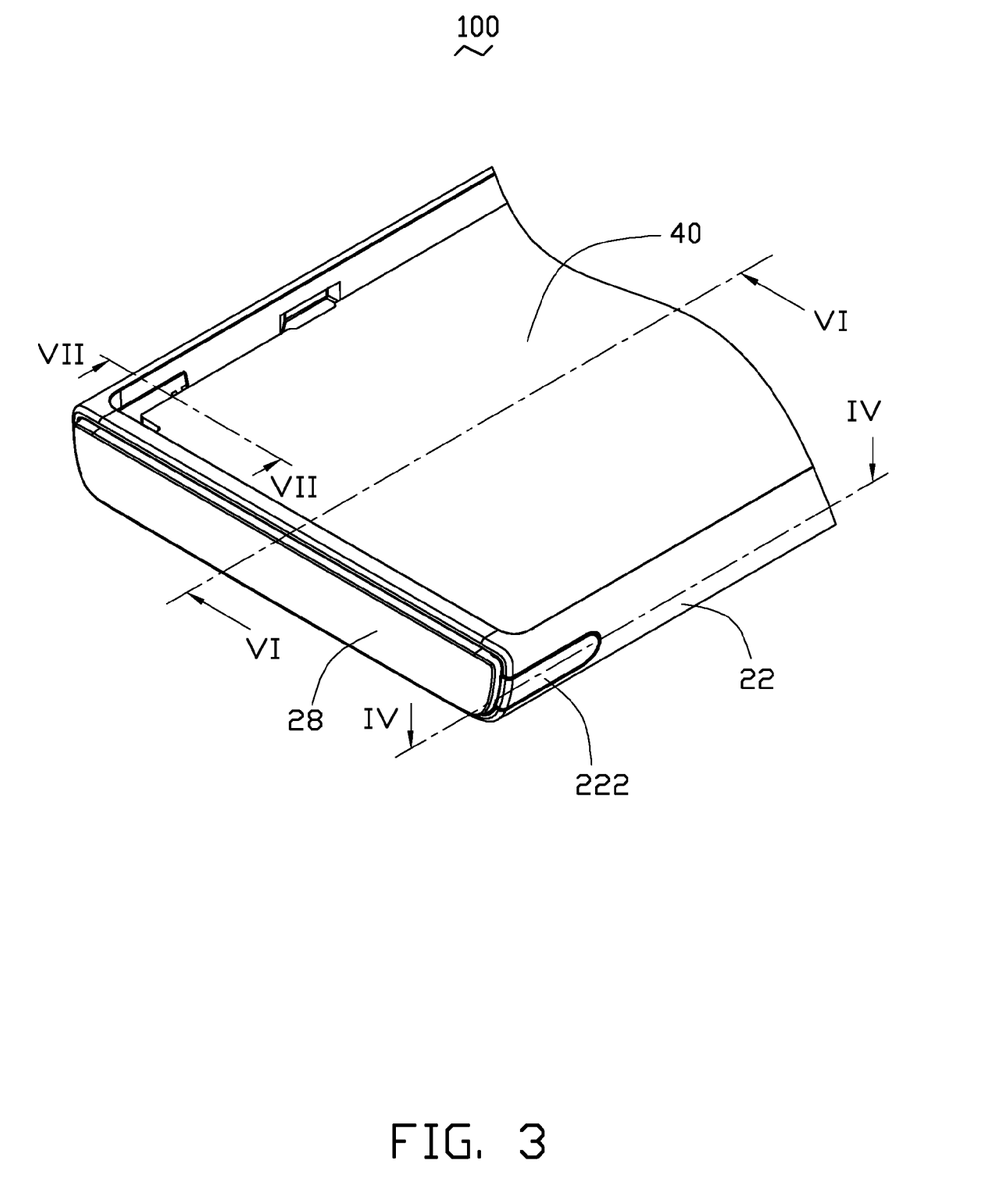
FIG. 3 is an assembled view of the portable electronic device.

FIGS. 1 to 3 show a first exemplary embodiment of an electronic device 100, such as a cellular phone or any electronic device where a chip card is required. The electronic device 100 includes a housing 10, a chip card holder 20, a first retaining board 40, a second retaining board 50.

The chip card holder 20 is attached to the housing 10. Two chip cards 30 can be simultaneously attached to the chip card holder 20. The chip card holder 20 includes a base 22, a drawer 24 and a cabinet 26. The cabinet 26 is defined in the base 22, in which the drawer 24 is received.

The base 22 may be a portion of the housing 10 or a separate element fixed to the housing 10. In this exemplary embodiment, the base 22 is a portion of the housing 10.

The drawer 24 includes a first surface 242, a second surface 243 spaced apart from the first surface 242, two opposite sidewalls 244, a first end 246 and a second end 248 spaced apart from the first end 246. The first surface 242 and the second surface 243 each define a receiving space 2422, in which one of the chip or flash cards 30 is received. Two limiting blocks 2442 protrudes from the sidewalls 244. In this exemplary embodiment, the limiting blocks 2442 are located near the second end 248. A cutout 2462 is defined at the first end 246 and communicates with the receiving spaces 2422. The cutout 2462 facilitates an user grasping chip cards 30 in the receiving spaces 2422 and can be used to facilitate removal of the chips cards 30 from the drawer 34 when the drawer 34 is completely removed from the cabinet 26.

The cabinet 26 includes a receiving compartment 262 and two limiting grooves 264. The drawer 24 is slidably received in the receiving compartment 262. The limiting grooves 264 are located at two sides of the receiving compartment 262 and communicate with the receiving compartment 262. Each limiting block 2442 is slidably received in one of the limiting grooves 264, to limit an inward maximum movement of the drawer 24, when sliding relative to the base 22. While in the current exemplary embodiment, the drawer 24 can be completely removed from the cabinet 26, in other embodiments, there may be additional structure that prevents complete removal of the drawer 24 and limits it outward maximum movement.

The chip cards 30 may both be subscriber identity modules (SIM) card or memory cards; or one of the chip cards 30 is SIM card, the other chip card 30 is memory cards.

The first retaining board 40 and the second retaining board 50 are oppositely attached to the housing 10. The first retaining board 40 has a first electrical connector 42. The second retaining board 50 has a second electrical connector 52. In this exemplary embodiment, the first retaining board 40 and the second retaining board 50 is a circuit board each.

Furthermore, the chip card holder 20 further includes a cover 28 covering the drawer 24 and detachably fixed to the base 22 so the drawer 24 is steadily fixed in the cabinet 26. In this exemplary embodiment, the cover 28 is substantially U-shaped, and includes a main body 282 and two latching portions 284 protruding from opposite ends of the main body 282. Each latching portion 284 includes a latching block 2842. The base 22 defines a slot 222 for accommodating the cover 28. The base 22 further defines two latching grooves 224. Each latching block 2842 is latched in one of the latching grooves 224 so the cover 28 is latched in the slot 222 and the main body 282 presses the drawer 24 in the cabinet 26.

Figure 4:
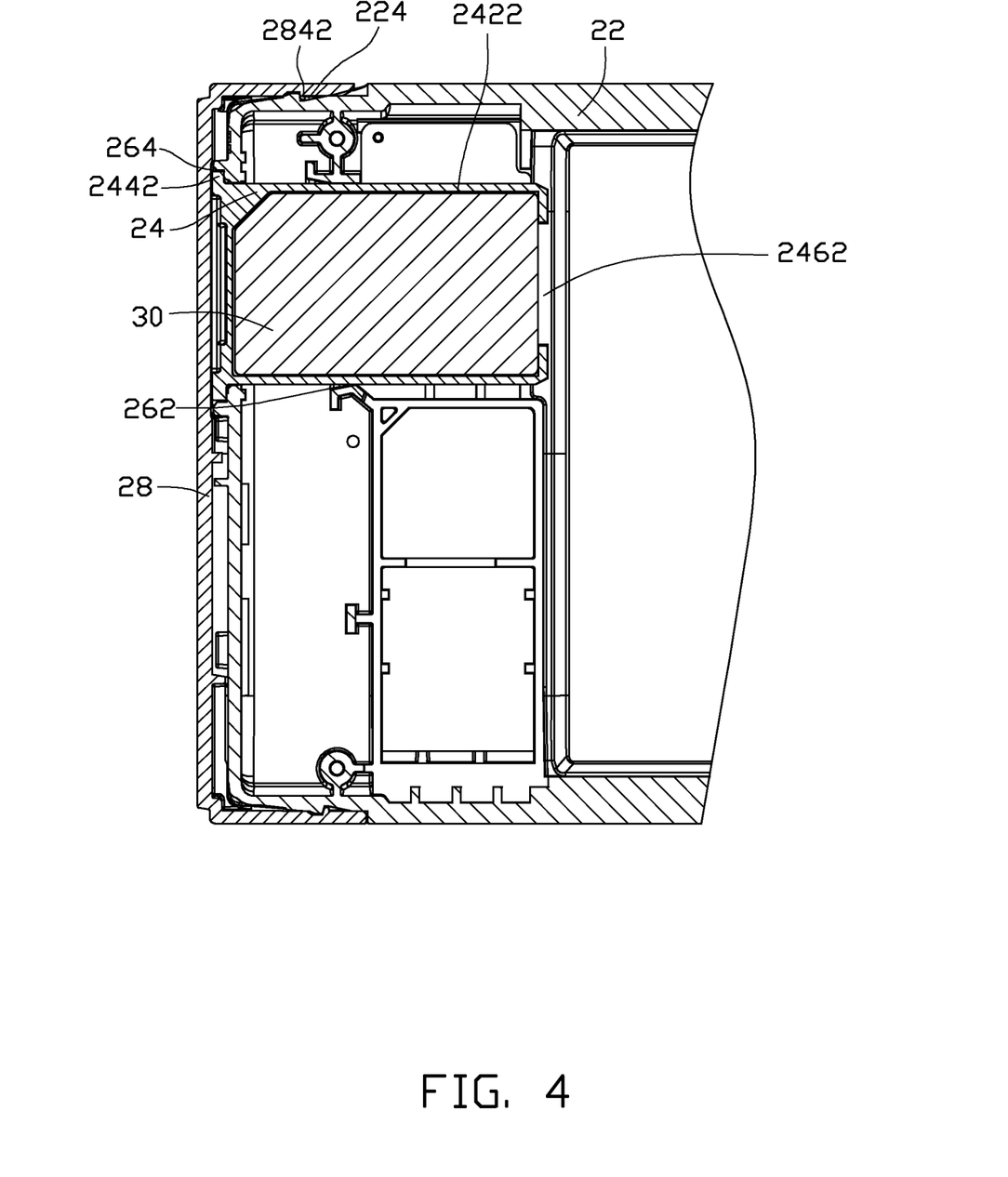
FIG. 4 is a cross sectional view of the electronic device of FIG. 3 along the line of IV-IV.
Figure 5:
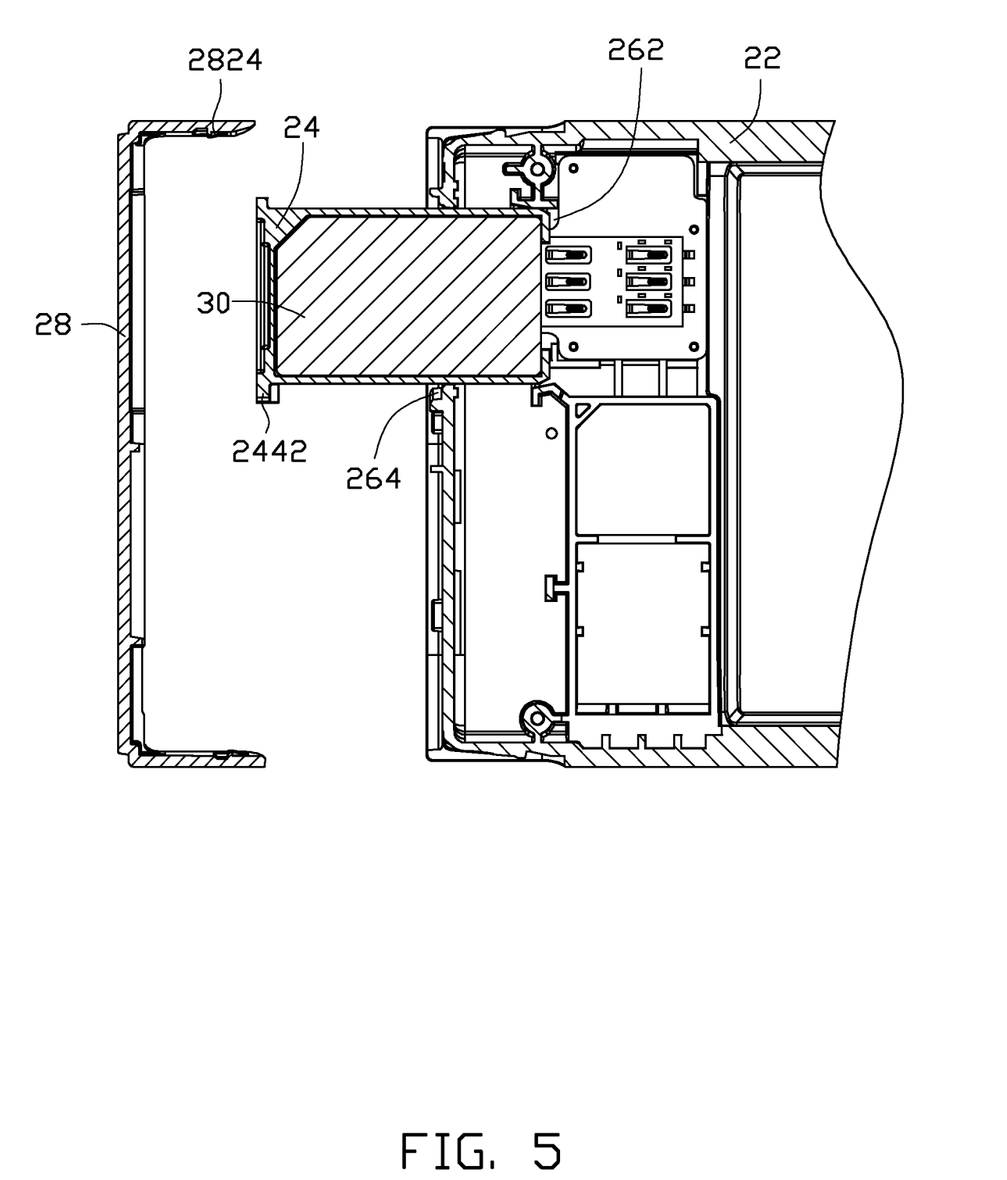
FIG. 5 is similar to FIG. 4, but the chip card(s) is/are ejected out of the housing.
Figure 6:
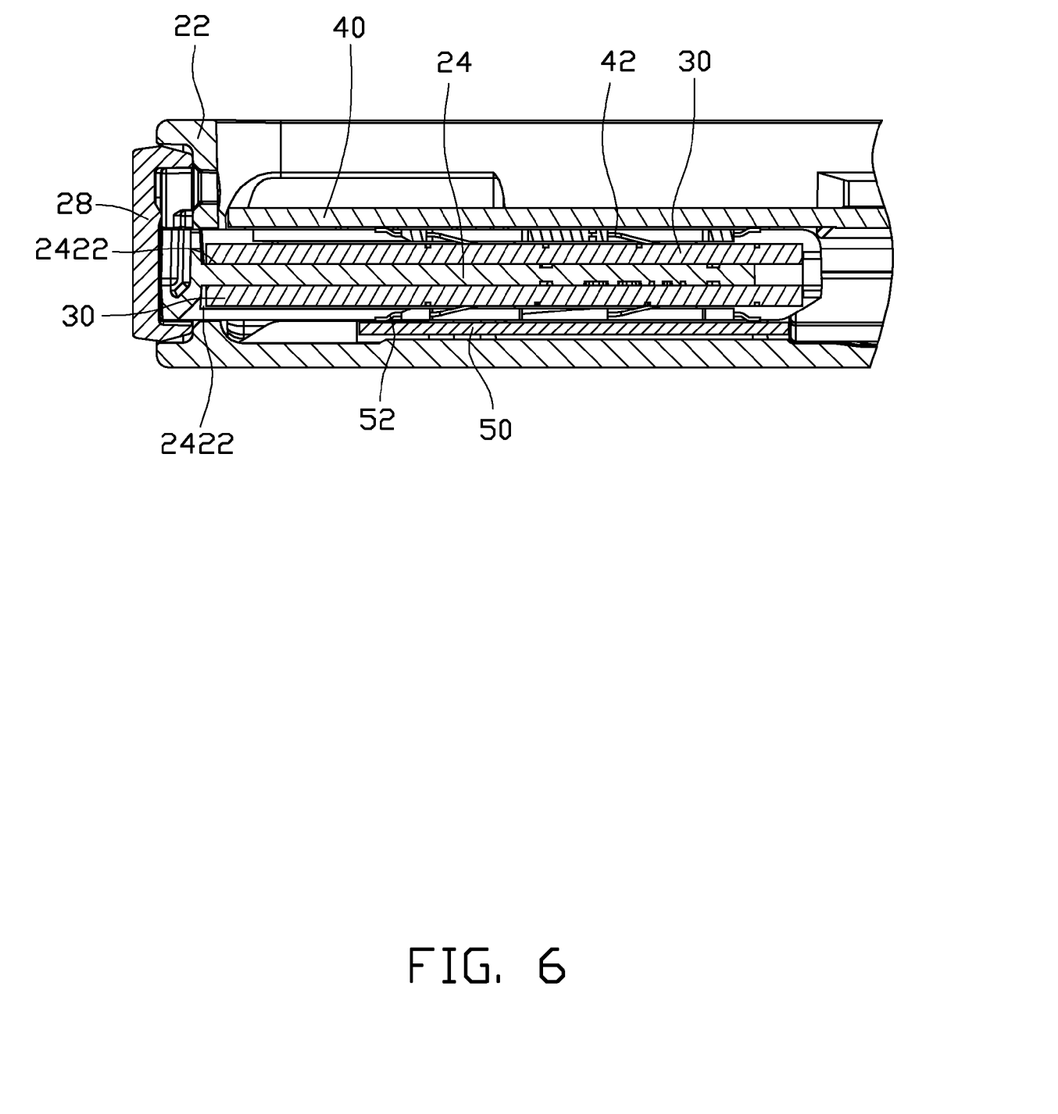
FIG. 6 is a cross sectional view of the electronic device of FIG. 3 along the line of VI-VI.

Referring to FIGS. 4 to 6, in use, the latching blocks 2842 are released from the latching grooves 224. The cover 28 is detached from the housing 10. The drawer 24 is slid completely out of the cabinet 26. The chip cards 30 are put into the receiving spaces 2422. The drawer 24 is then slid back into the receiving compartment 262 of the cabinet 26 until the limiting blocks 2442 are limited in the limiting grooves 264. At this time, the chip cards 30 respectively and electrically connect with the first connector 42 and the second connector 52, thereby putting the chip cards 30 in the electronic device 100.

In above chip card holder 20, the drawer 24 can be completely slid out of the cabinet 26 to expose it from the base 22, thereby facilitating grasping chip cards 30 out of the receiving spaces 2422 or putting the chip cards 30 in the receiving spaces 2422. Additionally, the receiving spaces 2422 are arranged in a stack, thereby reducing the area occupied by the chip card holder 20.

Figure 7:
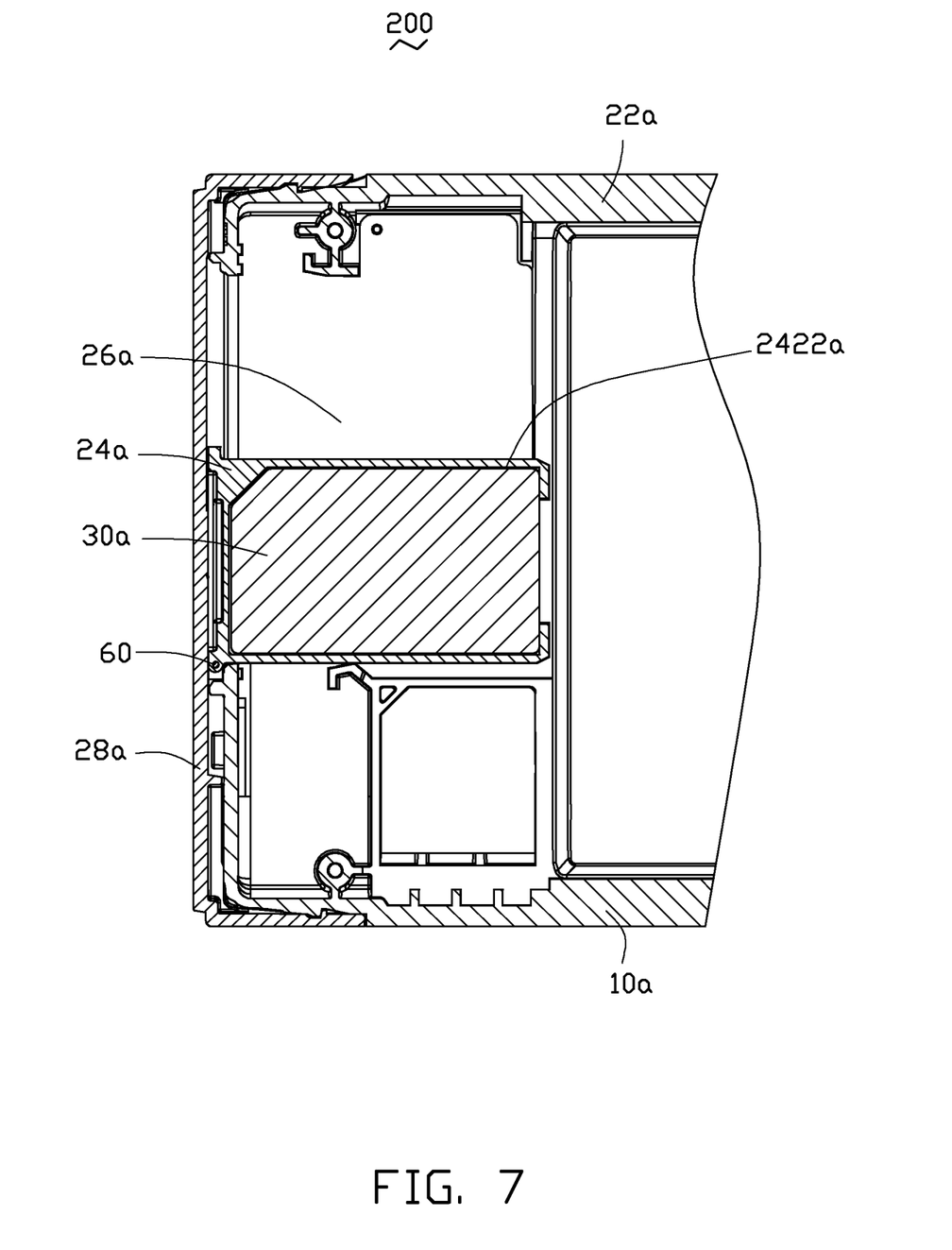
FIG. 7 is a cross sectional view of a second exemplary embodiment of the electronic device in a first state.
Figure 8:
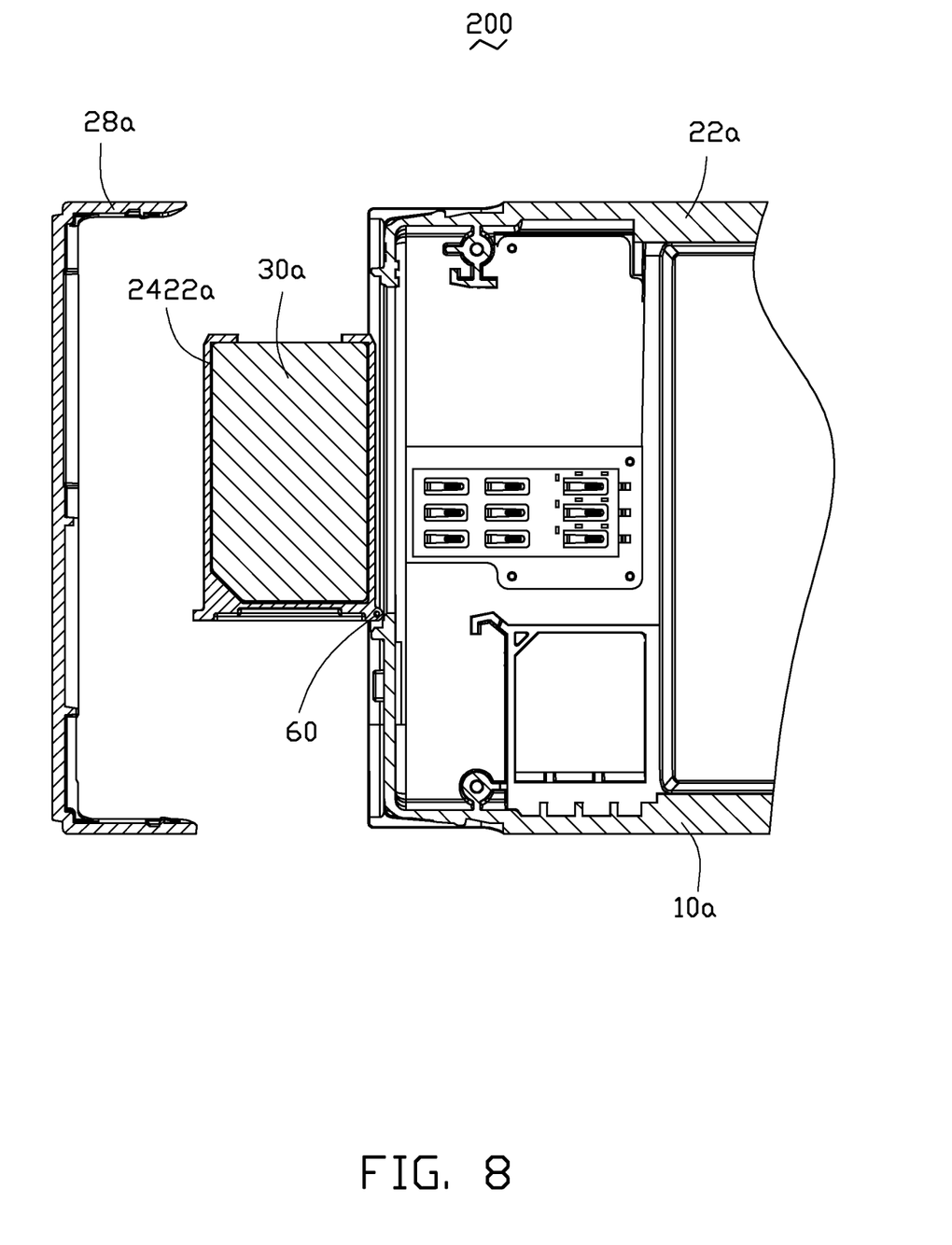
FIG. 8 is similar to FIG. 7, but showing the electronic device in a second state.

Referring to FIGS. 7 and 8, a second embodiment of an electrical device 200 is illustrated. The electrical device 200 is similar to the electrical device 100, but a drawer 24a of the electrical device 200 is rotatably attached to a base 22a of the electrical device 200 by a shaft 60 of the electrical device 200. When a chip card 30 of the electrical device 200 needs to be removed, the drawer 24a rotates relative to the base 22a about the shaft 60, until the drawer 24a is completely outside of the base 22a so a receiving space 2422a of the electrical device 200 and the chip card 30 of the electrical device 200 are completely exposed out of the base 22a, thereby facilitating removing the chip card 30a out of the base 22a.

Figure 9:
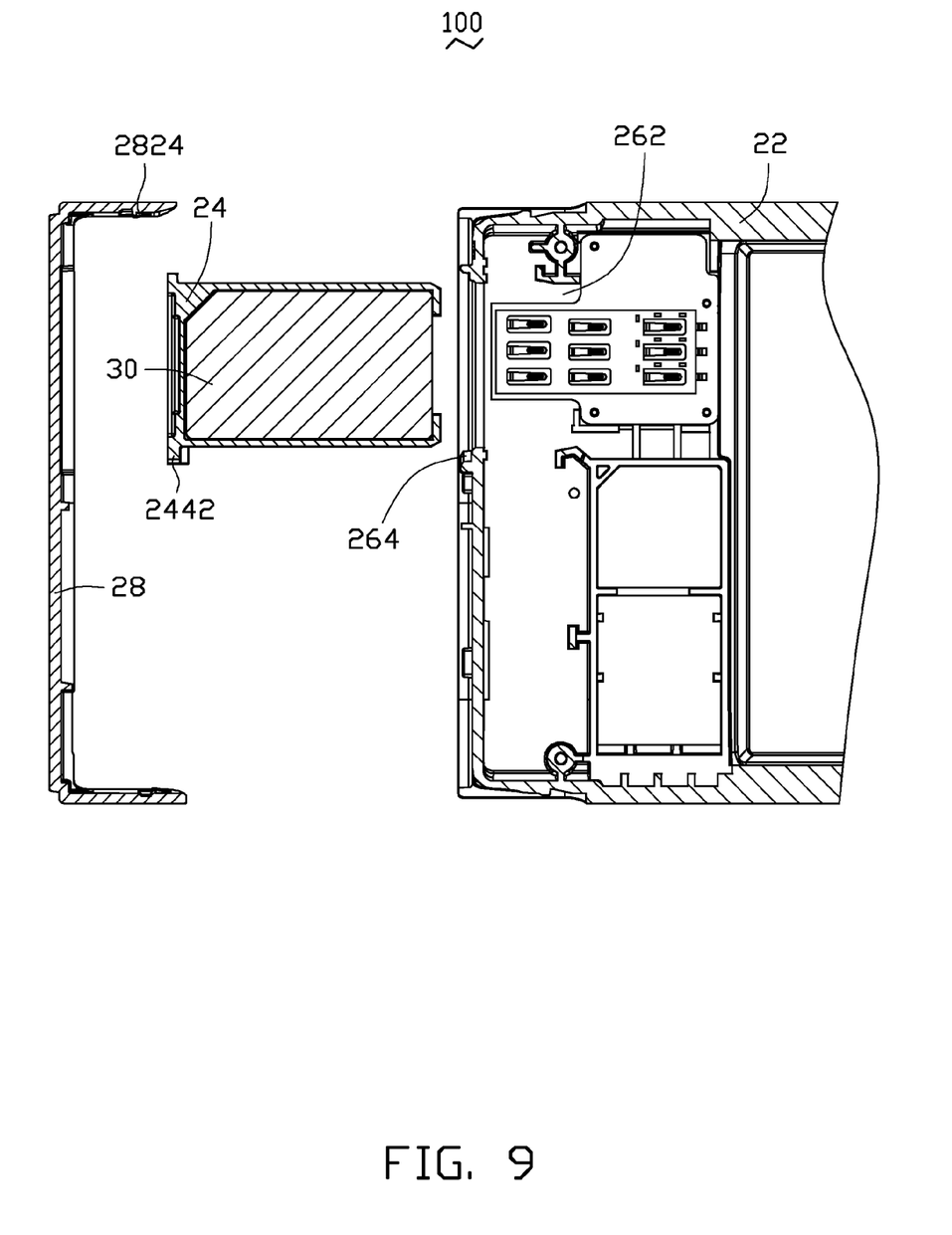
FIG. 9 is similar to FIG. 5, but a drawer is completely exposed.

FIG. 9 shows the first embodiment of FIG. 1 in the situation where the drawer 24 is can freely and completely slide out of the base 22. In other words, if the cabinet 26 is tilted, the drawer 24 can automatically slide out of the cabinet 26 under itself gravity. When the chip cards 30 need to be removed, two latching blocks 2842 are released from the latching grooves 224 to detach the cover 28. The cabinet 26 is tilted, the drawer 24 automatically slide out of the cabinet 26 so the receiving space 2422 and the chip cards 30 are exposed, thereby facilitating removing the chip card 30 out of the base 22.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card holder for holding two chip cards, the chip card holder comprising:
   a base;
   a drawer slidably attached to the base, the drawer including a first surface and a second surface opposite to the first surface, the first surface and the second surface each defining a receiving space, each receiving space for receiving a chip card;
   wherein the drawer moves relative to the base to make the two receiving spaces be either completely exposed out of the base or completely received in the base.

2. The chip card holder of claim 1, wherein the chip card holder further includes a cabinet defined in the base, the drawer movably received in the cabinet.

3. The chip card holder of claim 2, wherein the drawer further includes two opposite sidewalls, a limiting block protrudes from each sidewall; the cabinet includes a receiving compartment and two limiting grooves; the drawer is slidably received in the receiving compartment; the limiting grooves are located at two sides of the receiving compartment and communicate with the receiving compartment, each limiting block is slidably accommodated in one of the limiting grooves to limit a movement maximum of the drawer sliding relative to the base.

4. The chip card holder of claim 1, wherein the drawer is completely movable out of the base.

5. The electronic device of claim 1, wherein the chip card holder further includes a cover detatably fixed to the base, the cover is U-shaped, and includes a main body and two latching portions protruding from opposite ends of the main body, each latching portion includes a latching block, the base defines a slot and two latching grooves, the slot accommodate the main body, and each latching block is latched in one of the latching groove and the main body presses the drawer in the base.

6. An electronic device, comprising:
   a housing;
   a first retaining board having a first electrical connector;
   a second retaining board having a second electrical connector, the first retaining board and the second retaining board oppositely attached to the housing; and
   a chip card holder for holding two chip cards, the chip card holder comprising:
      a base being a portion of the housing and defining a cabinet;
      a drawer slidably attached to the base and positioned between the first retaining board and the second retaining board, the drawer including a first surface and a second surface opposite to the first surface, the first surface and the second surface each defining a receiving space, each receiving space for receiving a chip card;
      wherein the drawer is movably received in the cabinet, the drawer moves relative to the base to make the two receiving spaces be either completely exposed out of the base or completely received in the base.

7. The electronic device of claim 6, wherein the drawer further includes two opposite sidewalls, a limiting block protrudes from each sidewall; the cabinet includes a receiving compartment and two limiting grooves; the drawer is slidably received in the receiving compartment; the limiting grooves are located at two sides of the receiving compartment and communicate with the receiving compartment, each limiting block is slidably accommodated in one of the limiting grooves to limit a movement maximum of the drawer sliding relative to the base.

8. The electronic device of claim 6, wherein the chip card holder further includes a cover detatably fixed to the base, the cover covers the drawer.

9. The electronic device of claim 8, wherein the cover is U-shaped, and includes a main body and two latching portions protruding from opposite ends of the main body, each latching portion includes a latching block, the base defines a slot and two latching grooves, the slot accommodate the main body, and each latching block is latched in one of the latching groove and the main body presses the drawer in the cabinet.

10. A chip card holder for holding a first chip card and a second chip card, the chip card holder comprising:
   a base;
   a first retaining board having a first electrical connector;
   a second retaining board having a second electrical connector, the first retaining board and the second retaining board oppositely attached to the base;
   a drawer slidably attached to the base and positioned between the first retaining board and the second retaining board, the drawer including a first surface and a second surface opposite to the first surface, the first surface defining a first receiving space for receiving the first chip card, the first chip card electronically connected to the first electrical connector, the second surface defining a second receiving space for receiving the second chip card, the second chip card electronically connected to the second electrical connector;

wherein the drawer moves relative to the base to make the first receiving space and the second receiving space be either completely exposed out of the base or completely received in the base.

* * * * *